United States Patent
Klein (10) Patent No.: US 10,740,523 B1
(45) Date of Patent: Aug. 11, 2020

(54) SYSTEMS AND METHODS FOR PROVIDING DEFECT RECOVERY IN AN INTEGRATED CIRCUIT

(71) Applicant: Xilinx, Inc., San Jose, CA (US)

(72) Inventor: Matthew H. Klein, Redwood City, CA (US)

(73) Assignee: Xilinx, Inc., San Jose, CA (US)

(*) Notice: Subject to any disclaimer, the term of this patent is extended or adjusted under 35 U.S.C. 154(b) by 102 days.

(21) Appl. No.: 16/034,019

(22) Filed: Jul. 12, 2018

(51) Int. Cl.
G06F 17/50 (2006.01)
G06F 30/34 (2020.01)
G06F 30/373 (2020.01)
G06F 115/02 (2020.01)

(52) U.S. Cl.
CPC ............ *G06F 30/34* (2020.01); *G06F 30/373* (2020.01); *G06F 2115/02* (2020.01)

(58) Field of Classification Search
None
See application file for complete search history.

(56) References Cited

U.S. PATENT DOCUMENTS

| | | | | |
|---|---|---|---|---|
| 6,388,929 B1* | 5/2002 | Shimano | ................ | G11C 29/44 365/200 |
| 7,275,196 B2* | 9/2007 | Reblewski | .............. | G06F 11/27 714/3 |
| 7,461,362 B1* | 12/2008 | Caldwell | ............. | G06F 17/5054 716/132 |
| 7,941,572 B2* | 5/2011 | Norman | .............. | G02F 1/13318 342/175 |
| 8,856,602 B2* | 10/2014 | Brown | ........... | G01R 31/318566 714/726 |
| 9,012,245 B1 | 4/2015 | Klein et al. | | |
| 9,432,298 B1* | 8/2016 | Smith | ................. | H04L 49/9057 |
| 9,710,274 B2* | 7/2017 | Muff | .................... | G06F 9/30145 |
| 9,900,027 B1* | 2/2018 | Devlin | ............... | H03M 13/353 |
| 2016/0049941 A1* | 2/2016 | How | ................... | H03K 19/007 326/9 |
| 2017/0003347 A1* | 1/2017 | Benazouz | ........... | G06F 11/0793 |
| 2019/0073315 A1* | 3/2019 | Fang | .................. | G06F 12/0842 |
| 2019/0215280 A1* | 7/2019 | Hutton | ................ | G06F 15/7825 |

* cited by examiner

*Primary Examiner* — Leigh M Garbowski
(74) *Attorney, Agent, or Firm* — Haynes and Boone, LLP (57) ABSTRACT

A programmable logic device includes an integrated circuit die having a programmable fabric region including N identical programmable logic partitions. In some embodiments, N−1 of the identical programmable logic partitions are user-programmable. In addition, and in some cases, one of the identical programmable logic partitions is a spare logic partition. In some embodiments, the integrated circuit die further includes a network-on-a-chip (NOC) including a vertical NOC (VNOC) and a horizontal NOC (HNOC). By way of example, the N identical programmable logic partitions are configured to communicate exclusively through the NOC. In some embodiments, a defective one of the N−1 identical programmable logic partitions is configured for swapping with the spare logic partition.

20 Claims, 9 Drawing Sheets

SYSTEMS AND METHODS FOR PROVIDING DEFECT RECOVERY IN AN INTEGRATED CIRCUIT

TECHNICAL FIELD

Examples of the present disclosure generally relate to integrated circuits (ICs) and, in particular, to an embodiment related to systems and methods for providing swappable logic partitions for yield recovery in integrated circuits.

BACKGROUND

The electronics industry has experienced an ever increasing demand for smaller and faster electronic devices which are simultaneously able to support a greater number of increasingly complex and sophisticated functions. Accordingly, there is a continuing trend in the semiconductor industry to manufacture low-cost, high-performance, and low-power integrated circuits (ICs). Thus far these goals have been achieved in large part by scaling down semiconductor IC dimensions (e.g., minimum feature size) and thereby improving production efficiency and lowering associated costs. However, such scaling has also introduced increased complexity to the semiconductor manufacturing process. Thus, the realization of continued advances in semiconductor ICs and devices calls for similar advances in semiconductor design, manufacturing processes, and technology.

At least one existing challenge relates to defects formed during the fabrication of semiconductor wafers, IC die, and the devices included thereon. In some existing technologies, an IC die having one or more defects may be discarded, wasting valuable manufacturing and material resources. In some instances, an IC die with one or more defects may be recovered, for example, by blocking off large sections of the IC die that include the one or more defects, which substantially reduces the usable portion of the defective IC die. For the aggressively scaled devices that are currently being manufactured, there is an ever-increasing demand for solutions that address the problem of defective IC die without having to sacrifice valuable manufacturing and material resources, and without having to sacrifice large portions of an IC die.

Accordingly, there is a need for improved systems and methods for providing swappable logic partitions for yield recovery in integrated circuits.

SUMMARY

In some embodiments in accordance with the present disclosure, a method includes providing an integrated circuit (IC) die having a plurality of functionally equivalent processing elements, where the plurality of functionally equivalent processing elements includes at least one defective processing element. The method further includes loading configuration data into the IC die, where the configuration data is configured to instantiate a circuit design within the at least one defective processing element. In some embodiments and based on the at least one defective processing element, the circuit design is remapped from the at least one defective processing element to a spare processing element.

In some embodiments, the plurality of functionally equivalent processing elements includes a plurality of functionally equivalent logic partitions, the at least one defective processing element includes at least one defective logic partition, and the spare processing element includes a spare logic partition.

In some embodiments, the at least one defective processing element is marked using a one-time programmable on-die medium including one of a fuse and an antifuse.

In some embodiments, the method further includes loading the configuration data into an on-die configuration processor of the IC die, where the on-die configuration processor accesses defect data associated with the at least one defective processing element and performs the remapping based on the defect data.

In some embodiments, the method further includes responsive to the loading the configuration data, configuring a network-on-a-chip (NOC), where the NOC includes routing tables that identify source and destination addresses, and where based on the remapping the circuit design, updating the routing tables.

In some embodiments, the at least one defective processing element and the spare processing element communicate with each other exclusively through the NOC.

In some embodiments in accordance with the present disclosure, a method includes testing the functionality of an integrated circuit (IC) die that includes a plurality of regions. In some embodiments, each of the plurality of regions includes a plurality of functionally equivalent processing elements, where at least one processing element within each of the plurality of regions is a spare processing element, and where each of the plurality of functionally equivalent processing elements within each of the plurality of regions are configured to communicate with each other exclusively through a network-on-a-chip (NOC). In some examples, the method further includes marking at least one of the plurality of functionally equivalent processing elements within a given region as unusable. In various embodiments, the unusable processing element is configured for swapping with the spare processing element within the given region.

In some embodiments, the IC die includes a programmable logic device, where the plurality of regions includes a plurality of programmable fabric regions, where the plurality of functionally equivalent processing elements includes a plurality of functionally equivalent logic partitions, where the spare processing element includes a spare logic partition, where the IC die includes an on-die processor, and where the on-die processor is configured to perform the swapping of the unusable processing element with the spare processing element.

In some embodiments, the NOC includes a vertical NOC (VNOC) and a horizontal NOC (HNOC), and each of the plurality of functionally equivalent processing elements within each of the plurality of regions is directly connected to the VNOC.

In some embodiments, the method further includes in response to marking the at least one of the plurality of functionally equivalent processing elements as unusable, generating and storing, within an on-chip memory, defect data associated with the unusable functionally equivalent processing element.

In some embodiments in accordance with the present disclosure, an integrated circuit (IC) die includes a region including N functionally equivalent processing elements, where N−1 of the functionally equivalent processing elements are user-accessible, and where at least one of the N functionally equivalent processing elements is a spare processing element. In some examples, the IC die further includes a network-on-a-chip (NOC), where the N functionally equivalent processing elements are configured to communicate with each other exclusively through the NOC. In some embodiments, a defective one of the N−1 functionally equivalent processing elements is configured for swapping with the spare processing element.

In some embodiments, the IC die includes a programmable logic device.

In some embodiments, the region includes a programmable fabric region, the functionally equivalent processing elements include functionally equivalent programmable logic partitions, and the spare processing element includes a spare logic partition.

In some embodiments, the N−1 of the functionally equivalent programmable logic partitions are user-programmable.

In some embodiments, the NOC further includes a vertical NOC (VNOC) and a horizontal NOC (HNOC), and each of the functionally equivalent processing elements is directly connected to the VNOC.

In some embodiments, the IC die further includes an on-die processor, where the on-die processor is configured to perform the swapping of the defective one of the N−1 functionally equivalent processing elements with the spare processing element.

In some embodiments, the IC die further includes an on-chip memory storing defect data, where the on-chip memory is connected to the on-die processor, and where the on-die processor is configured to access the defect data prior to performing the swapping.

In some embodiments, the IC die further includes a one-time programmable on-die medium including one of a fuse and an antifuse, where the one-time programmable on-die medium is configured to mark the defective one of the N−1 functionally equivalent processing elements.

In some embodiments, the N−1 functionally equivalent processing elements include N−1 functionally equivalent programmable logic partitions, and the one-time programmable on-die medium is configured to mark the defective one of the N−1 functionally equivalent programmable logic partitions.

In some embodiments, a first pair of functionally equivalent processing elements are merged to form a double logic partition, at least one processing element of the first pair including a defect, a second pair of functionally equivalent processing elements are merged to form a spare double logic partition, and the double logic partition is configured for swapping with the spare double logic partition.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding.

As discussed above, defects formed during the fabrication of semiconductor wafers, IC die, and the devices included thereon, remains a challenge. In some existing technologies, an IC die having one or more defects may be discarded, wasting valuable manufacturing and material resources. In some instances, an IC die with one or more defects may be recovered. For example, after manufacture of a semiconductor wafer including a plurality of IC die having circuit elements formed thereon, an electronic tester may be used to test the functionality of the circuit elements on each of the plurality of IC die. Defect-free IC die may be packaged as a first product including all the resources (e.g., gigabit transceivers, input/output blocks, random access memory blocks, multipliers, digital signal processing blocks, clock managers, delay lock loops, logic blocks, etc.) originally manufactured on the IC die. Alternatively, IC die that are found to have one or more defects (e.g., defective circuit elements) will have fewer resources (e.g., fewer functional circuit elements) available. In some cases, by blocking off large sections of the defective IC die that include the defective circuit elements, the defective IC die may be recovered, and the recovered IC die may be packaged as a second product including a subset of the resources originally manufactured on the IC die. Thus, the second product, made using the recovered IC die, may be referred to as a "derived product" since the first and second products are originally manufactured to the same specification, but the second product made from the recovered IC die has fewer resources available than the first product made from the defect-free IC die. While the defective IC die may be recovered, blocking off large sections of the defective IC die results in a substantial reduction of the usable portion of the defective IC die. At least some of the reasons for having to block off large sections of the defective IC die is due to the lack of regularity of logic partitions in current designs, as well as allowing logic partitions to have connectivity into other areas of the IC die without providing fixed boundaries. As such, defects cannot be effectively isolated, and recovery of the defective die thus requires blocking off large sections of the defective IC die. For the aggressively scaled devices that are currently being manufactured, there is an ever-increasing demand for solutions that address the problem of defective IC die without having to sacrifice valuable manufacturing and material resources, and without having to sacrifice large portions of an IC die. For integrated circuit (IC) solutions, it has been discovered that using swappable logic partitions to remap defective logic partitions, and by implementing a network-on-a-chip (NOC) to provide boundaries and control over communication between logic partitions, defective IC die may be recovered without having to sacrifice large portions, and thus a large amount of resources, of the defective IC die.

With the above general understanding borne in mind, various embodiments of the present disclosure are generally described below. Various advantages may be present in various applications of the present disclosure. No particular advantage is required for all embodiments, and different embodiments may offer different advantages. For example, embodiments discussed herein include methods and systems for providing swappable logic partitions for yield recovery in integrated circuits. In some embodiments, an FPGA architecture is provided that includes N-identical programmable logic partitions that have identical layout and resources. However, while many embodiments are described as including "identical" programmable logic partitions, persons of skill in the art having the benefit of this disclosure will understand that minor variations to a layout or circuit implementation may nonetheless be acceptable and are within the scope of the present disclosure. Such variations, in addition to "identical" programmable logic partitions, may be referred to herein as "functionally equivalent" programmable logic partitions. In some examples, the "logic partitions" described herein may include a type of "processing element" that is substantially equivalent to one or more of the "programmable tiles" discussed below with respect to FIG. 1. Generally, if there is a defect (e.g., a defective circuit element) in a particular logic partition, the defective logic partition may be marked as unusable and replaced by an identical spare logic partition. Thus, the defective logic partition is "swapped" with the identical spare logic partition. As such, embodiments of the present disclosure provide for sacrificing merely the defective logic portion, rather than sacrificing a large portion of an IC die, as may currently be done. In some embodiments, a spare logic partition may be provided by reducing the number of user-programmable logic partitions by one, such that N−1 identical programmable logic partitions are available. In general, the number of user-programmable logic partitions may be reduced as much as needed to provide a desired number of spare logic partitions. While the available number of logic partitions is slightly reduced by providing one or more spare logic partitions, recovery of defective IC die is substantially increased, as the defect may be located within any of the identical programmable logic partitions. In practice, and as described above, an electronic tester may be used to test the functionality of the circuit elements on each of a plurality of IC die manufactured on a semiconductor wafer. In various examples, an IC die that is found to have a defect (e.g., defective circuit elements) in a particular logic partition will have that logic partition marked as being defective. For example, the defective logic partition may be marked by using a fuse (e.g., an eFuse), an antifuse, or by another one-time programmable on-die medium. Thereafter, at a configuration load time or during a partial reconfiguration process, an on-die configuration processor (e.g., PMC 220, discussed below) can read the location of the defective logic partition and remap the defective logic partition to an identical spare logic partition, thus swapping the defective logic partition with the identical spare logic partition.

In addition, embodiments of the present disclosure provide methods and systems for communicating between the N-identical programmable logic partitions using a network-on-a-chip (NOC). In some embodiments, communication via the NOC provides boundaries and control over communication between the logic partitions. For example, the N-identical logic partitions may have connectivity to the NOC, while not having direct connectivity into other areas of the IC die. Moreover, since the NOC operates as an address-mapped structure, NOC routing tables (e.g., including source and destination addresses) may easily and quickly be updated to reflect the swapping of the defective logic partition with the identical spare logic partition. Also, since the logic partitions communicate through the NOC and because of the address-mapping of the NOC, it will not matter where a defect is located within the N-identical programmable logic partitions. Thus, embodiments of the present disclosure provide for greatly improved yield recovery in integrated circuits. Additional embodiments and advantages are discussed below and/or will be evident to those skilled in the art in possession of this disclosure.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, for each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
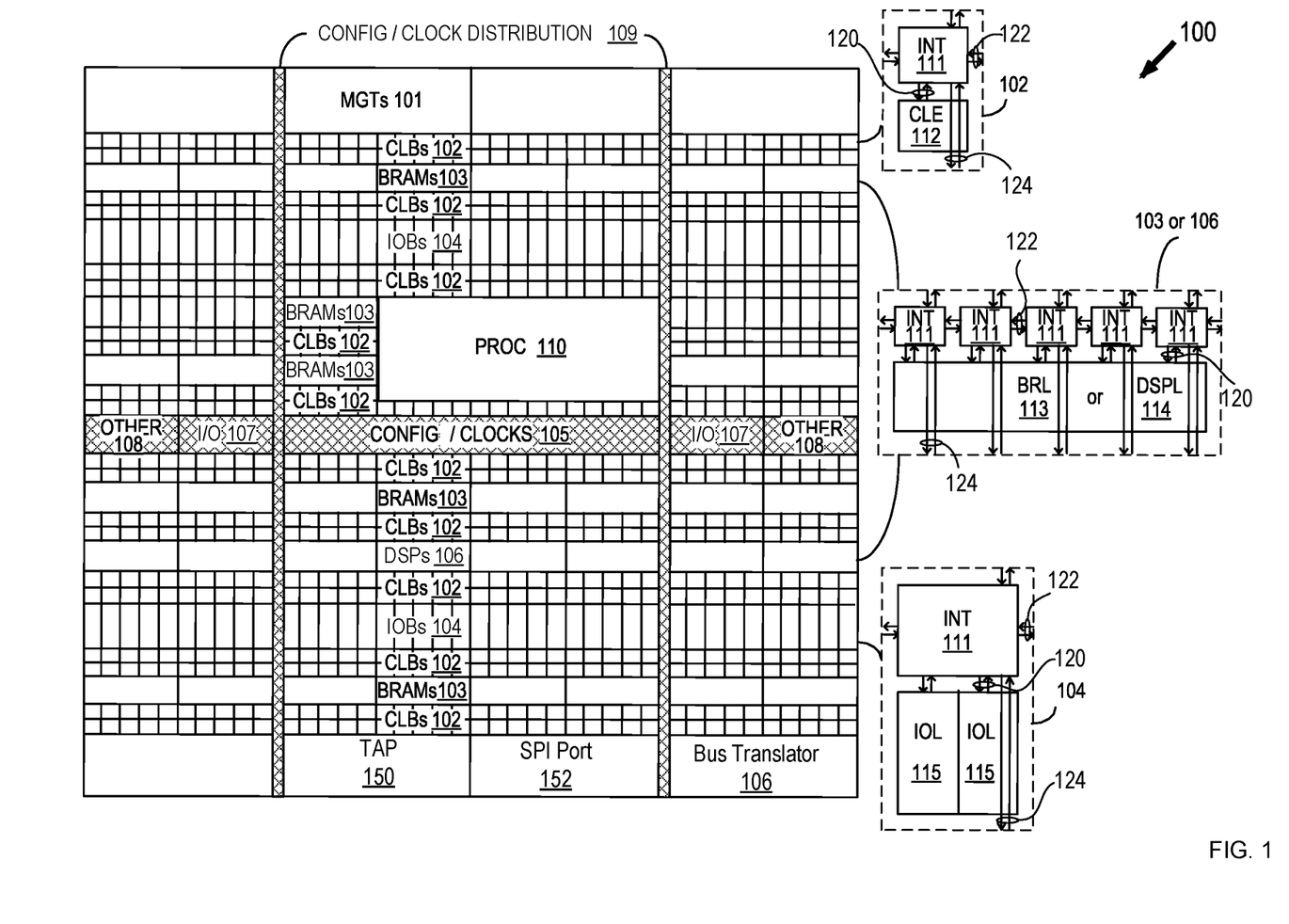
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown).

The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may incorporate the semiconductor devices including the swappable logic partitions that communicate using a NOC is not limited to the exemplary IC depicted in FIG. 1, and that ICs having other configurations, or other types of ICs, may also include the swappable partitions and NOC.

Figure 2:
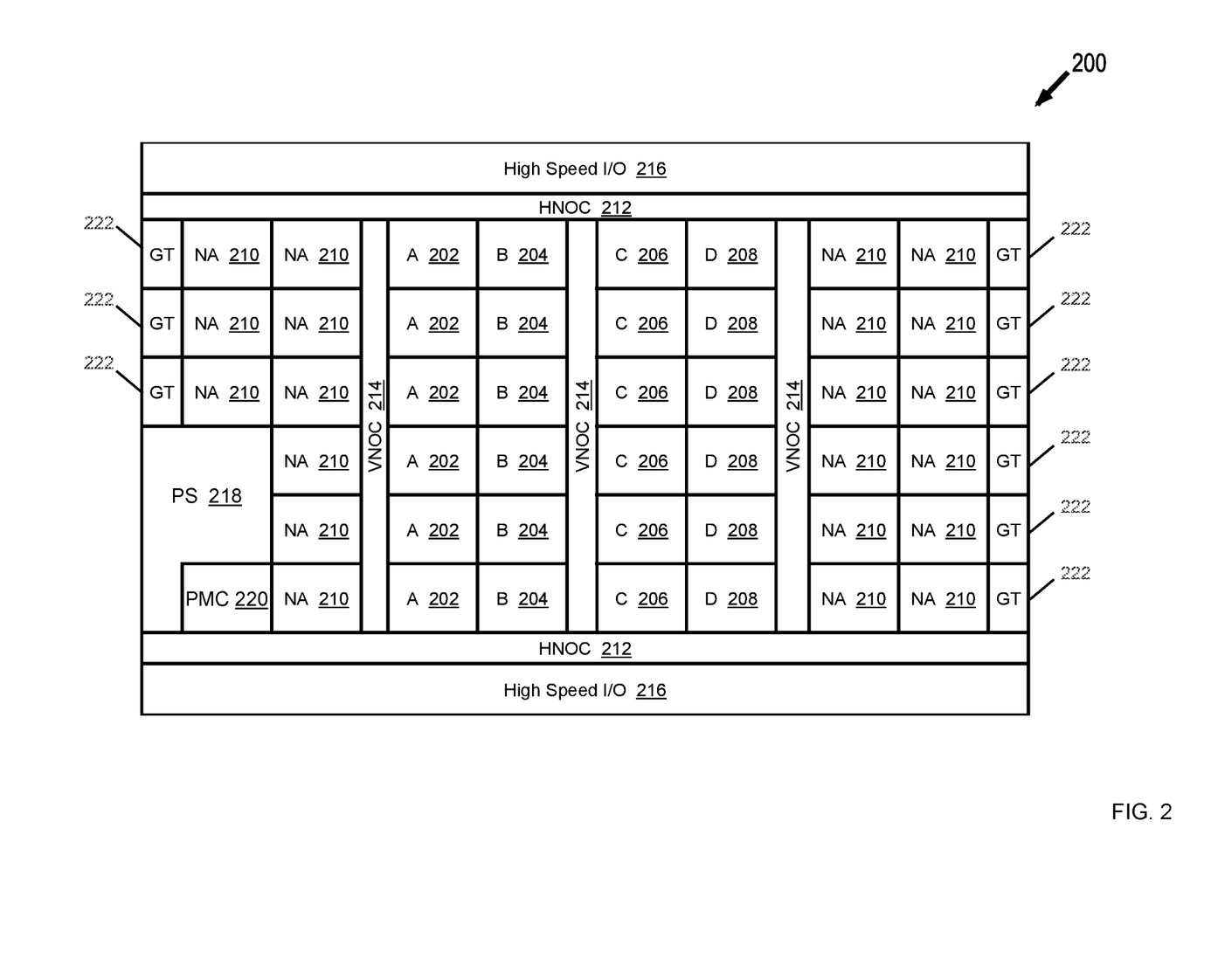
FIG. 2 is a block diagram illustrating an exemplary architecture for an IC, including N-identical programmable logic partitions, according to some embodiments of the present disclosure.

For purposes of the discussion that follows, reference is now made to the example of FIG. 2, which shows an exemplary FPGA architecture 200. In some embodiments, the FPGA architecture 200 may share one or more aspects of the FPGA architecture 100, discussed above with respect to FIG. 1. However, the architecture 200 includes N-identical programmable logic partitions that are configured to communicate using a network-on-a-chip (NOC). As shown in FIG. 2, the FPGA architecture 200 includes a large number of partitions, including a large number of programmable partitions. For example, the architecture 200 includes a programmable fabric region 'A' including logic partitions A 202, a programmable fabric region 'B' including logic partitions B 204, a programmable fabric region 'C' including logic partitions C 206, and a programmable fabric region 'D' including logic partitions D 208. In various embodiments, each of the logic partitions within a particular programmable fabric region are the same as each other. Thus, each of the logic partitions A 202 of the fabric region 'A' are identical to each other, each of the logic partitions B 204 of the fabric region 'B' are identical to each other, each of the logic partitions C 206 of the fabric region 'C' are identical to each other, and each of the logic partitions D 208 of the fabric region 'D' are identical to each other. The architecture 200 further includes a network-on-a-chip (NOC) that provides connectivity between the various blocks of the architecture 200. In some examples, the architecture 200 includes a horizontal NOC (HNOC) 212 and a vertical NOC (VNOC) 214. By way of example, the logic partitions of the programmable fabric regions A, B, C, and D may communicate with each other using the HNOC 212 or the VNOC 214. However, it at least some embodiments, the logic partitions of the programmable fabric regions A, B, C, and D may communicate with each other using a programmable interconnect connection, as described above.

In various examples, the architecture 200 of FIG. 2 may also include a programmable fabric region including unrestricted (e.g., non-swappable) logic partitions, referred to as logic partitions NA 210, as well as high speed I/O blocks 216, a processor system (PS) 218, a platform management controller (PMC) 220, and gigabit transceivers (GTs) 222. In some embodiments, each of the logic partitions NA 210, the I/O 216. the PS 218, the PMC 220, and the GTs 222 may communicate with other blocks of the architecture 200 using the HNOC 212, the VNOC 214, programmable interconnect connections, or a combination thereof. While not explicitly shown, it will be understood that the architecture 200 may include one or more of the elements discussed above with reference to FIG. 1, such as configurable logic blocks (CLBs), random access memory blocks (BRAMs), configuration and clocking logic, digital signal processing blocks (DSPs), flip-flops, other input/output blocks, and other programmable logic such as digital clock managers, analog-to-digital converters, system monitoring logic, etc.

In various embodiments, an integrated circuit (e.g., an FPGA) including the architecture 200 may be fabricated on a silicon substrate and may include various doping configurations depending on design requirements. In addition, in some cases, the integrated circuit may be fabricated on a substrate including other semiconductors such as germanium, silicon carbide (SiC), silicon germanium (SiGe), or diamond. Alternatively, the substrate may include a compound semiconductor and/or an alloy semiconductor. Further, the substrate may optionally include an epitaxial layer (epi-layer), may be strained for performance enhancement, may include a silicon-on-insulator (SOI) structure, and/or have other suitable enhancement features. The integrated circuit including the architecture 200 may further include various devices formed in or on the substrate such as active components including Field Effect Transistors (FETs), Bipolar Junction Transistors (BJTs), and diodes, passive components including resistors, capacitors, and transformers, or other suitable devices.

Figure 3:
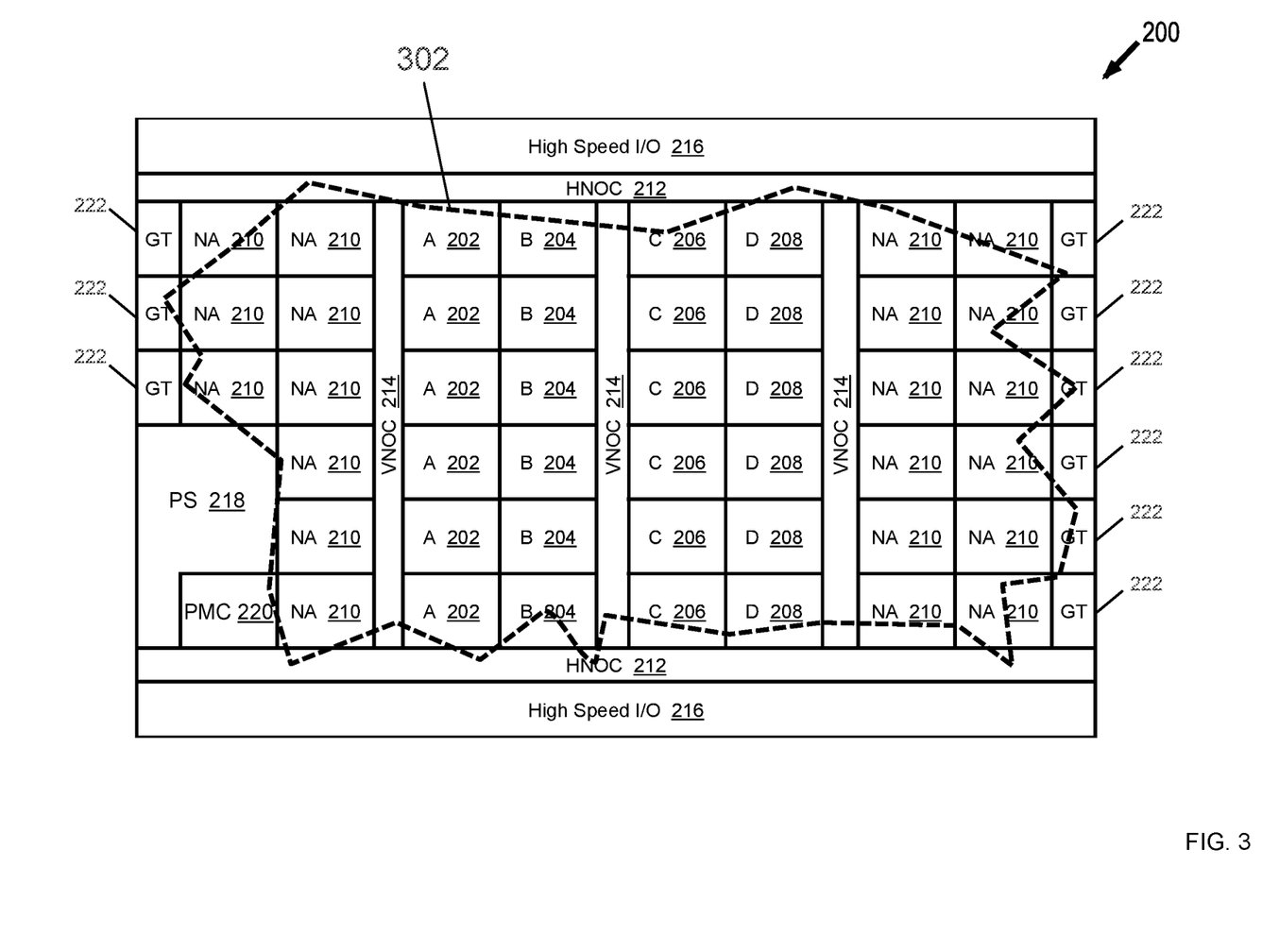
FIG. 3 is a block diagram illustrating a particular FPGA design implemented across programmable fabric regions of the exemplary architecture of FIG. 2, according to some embodiments.

With reference to FIG. 3, and by way of example, a place and route algorithm may be used to place and route a particular FPGA design 302 across an entirety of the programmable fabric regions (e.g., such as the regions A, B, C, D, and NA). Thus, in such an example, a configuration bitstream that is used to program the programmable fabric regions of the FPGA 200 may implement or instantiate the FPGA design 302 across the programmable fabric regions, without regard to the logic partitions. By way of example, implementing the FPGA design 302 across the programmable fabric region, as shown in FIG. 3, is not a defect-tolerant design. While each of the logic partitions within a given fabric region A, B, C, D are identical to each other, there are no spare logic partitions since the FPGA design 302 has been placed and routed across the entirety of the programmable fabric regions. In contrast, and as discussed below, embodiments of the present disclosure provide one or more spare logic partitions by reducing the number of user-programmable logic partitions. For example, in order to provide a spare logic partition for the architecture 200 that includes the N-identical programmable logic partitions, the number of user-programmable logic partitions available is reduced to N−1. Even for FPGA architectures and designs that include a partial reconfiguration region, a given FPGA design may nevertheless infiltrate into the partial configuration region, which still results in a design that is not defect-tolerant.

Figure 4:
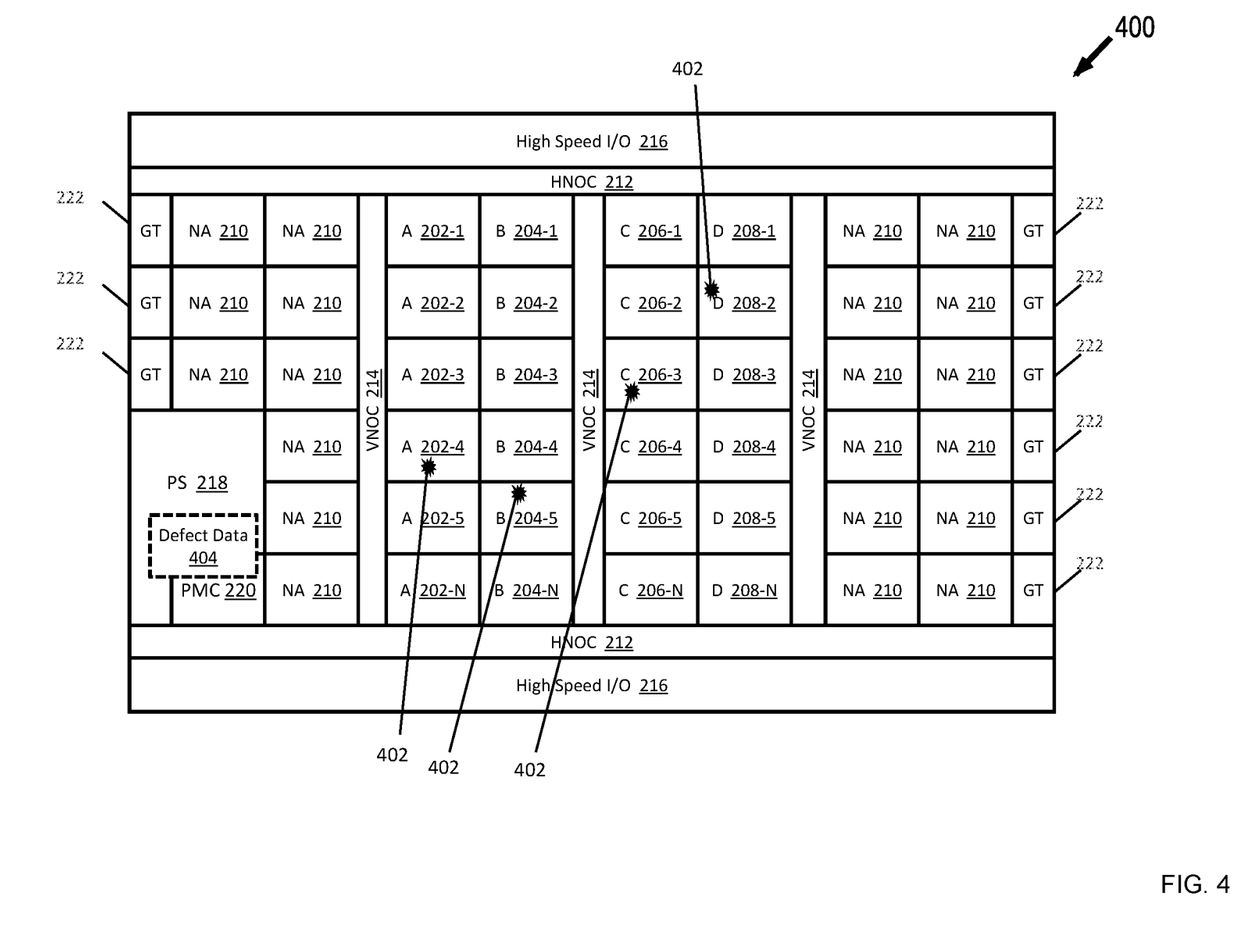
FIG. 4 is a block diagram illustrating an exemplary architecture for an IC, including N-identical programmable logic partitions and spare logic partitions, according to some embodiments of the present disclosure.

Referring now to FIG. 4, illustrated therein is an exemplary FPGA architecture 400. In some embodiments, the FPGA architecture 400 is substantially the same as the FPGA architecture 200, discussed above with respect to FIG. 2. However, in contrast to the architecture 200, the architecture 400 includes spare logic partitions and a slightly reduced number of user-programmable logic partitions. For example, the architecture 400 includes the programmable fabric region A including identical logic partitions A 202-1, A 202-2, A 202-3, A 202-4, A 202-5, and A 202-N, the programmable fabric region B including identical logic partitions B 204-1, B 204-2, B 204-3, B 204-4, B 204-5, and B 204-N, the programmable fabric region C including identical logic partitions C 206-1, C 206-2, C 206-3, C 206-4, C 206-5, and C 206-N, and the programmable fabric region D including identical logic partitions D 208-1, D 208-2, D 208-3, D 208-4, D 208-5, and D 208-N. In some embodiments, the logic partition A 202-N is a spare logic partition for the fabric region A, the logic partition B 204-N is a spare logic partition for the fabric region B, the logic partition C 206-N is a spare logic partition for the fabric region C, and the logic partition D 208-N is a spare logic partition for the fabric region D. By way of example, the remainder of the logic partitions of each of the fabric regions A, B, C, D (e.g., excluding the spare logic partitions) are user-programmable logic partitions. Moreover, during a place and route process, a placement and routing algorithm may be used to place and route a particular FPGA design within the user-programmable logic partitions of regions A, B, C, D, as well as within unrestricted logic partitions NA 210, but not within the spare logic partitions A 202-N, B 204-N, C 206-N, and D 208-N. Thus, while reserving the logic partitions A 202-N, B 204-N, C 206-N, and D 208-N as spares reduces the number of user-programmable logic partitions, yield recovery of the FPGA is substantially increased. In addition, while the example of FIG. 4 illustrates one spare logic partition for each of the fabric regions A, B, C, D, it will be understood that generally the number of user-programmable logic partitions may be reduced as much as needed to provide a desired number of spare logic partitions. In at least some embodiments, the number of user-programmable logic partitions may not be reduced, and instead the spare logic partitions may be added to an existing FPGA architecture. In some cases, adding the spare logic partitions to an existing FPGA architecture may increase a size of an IC die.

The architecture 400 also includes the HNOC 212 and the VNOC 214. For purposes that will become clear in the discussion that follows, and with respect to the architecture 400, the logic partitions of the programmable fabric regions A, B, C, and D may communicate with each other exclusively through the HNOC 212 and the VNOC 214. In various examples, the architecture 400 also includes the high speed I/O blocks 216, the PS 218, the PMC 220, and the GTs 222. Similar to the architecture 200, the architecture 400 may additionally include one or more of the elements discussed above with reference to FIG. 1, such as CLBs, BRAMs, configuration and clocking logic, DSPs, flip-flops, other input/output blocks, and other programmable logic such as digital clock managers, analog-to-digital converters, system monitoring logic, etc.

FIG. 4 also illustrates defects 402 that may be discovered within various logic partitions of an FPGA, for example, during electronic testing of the circuit elements of the FPGA IC die manufactured on a semiconductor wafer. In the present example, electronic testing of the FPGA may discover defects 402 within logic partitions A202-4, B 204-5, C 206-3, and D 208-2. While a particular number of defects 402 are illustrated as being in particular logic partitions, it will be understood that in some embodiments there may be a greater or lesser number of defects, and the defects 402 may be located within any of the identical logic partitions within any of the fabric regions A, B, C, D. In some cases, and in accordance with embodiments of the present disclosure, each of the defective logic partitions A202-4, B 204-5, C 206-3, and D 208-2 may be marked as unusable, for example, by using a fuse (e.g., an eFuse), an antifuse, or by another one-time programmable on-die medium. As discussed in more detail below, each of the defective logic partitions may be effectively replaced by (e.g., swapped for) an identical spare logic partition. For example, the defective logic partition A202-4 may be swapped with the identical spare logic partition A202-N, the defective logic partition A204-5 may be swapped with the identical spare logic partition A204-N, the defective logic partition A206-3 may be swapped with the identical spare logic partition A206-N, and the defective logic partition A208-2 may be swapped with the identical spare logic partition A208-N. Thus, by providing the spare logic partitions A 202-N, B 204-N, C 206-N, and D 208-N, the FPGA architecture 400 provides a defect tolerant design. In addition, in some embodiments, a total area of the fabric regions A, B, C, and D may be large enough to recover an IC die having defects across a significant portion of the IC die, resulting in significant material recovery and a significant increase in shippable products. It is noted, however, that is cases where defects are found to be outside of the fabric regions A, B, C, D, the IC die may be scrapped.

Still referring to FIG. 4, illustrated therein is defect data 404. In some embodiments, the defect data 404 corresponds to the defects 402 and identifies the location of each of the defects 402. In various examples, the defect data 404 is stored in an on-chip memory and is accessible to the platform management controller (PMC) 220 at a configuration load time or during a partial reconfiguration process. By way of example, the PMC 220 may read the defect data 404 to determine the location of the defective logic partitions (e.g., the defective logic partitions A202-4, B 204-5, C 206-3, and D 208-2) and remap the defective logic partitions to the identical spare logic partitions, thereby effectively swapping the defective logic partitions with the identical spare logic partitions.

In order to take full advantage of the yield recovery provided by the swappable logic partitions, and in some embodiments, communication between the identical logic partitions (e.g., in fabric regions A, B, C, D) should be carefully controlled. For example, as discussed above, and with respect to the architecture 400, the logic partitions of the programmable fabric regions A, B, C, and D may communicate with each other exclusively through the HNOC 212 and the VNOC 214. In some embodiments, such a communication scheme may be implemented within a place and route algorithm in order to optimally place and route a particular FPGA design within the user-programmable logic partitions of regions A, B, C, D and to control the communication between the logic partitions A, B, C, D.

Figure 5:
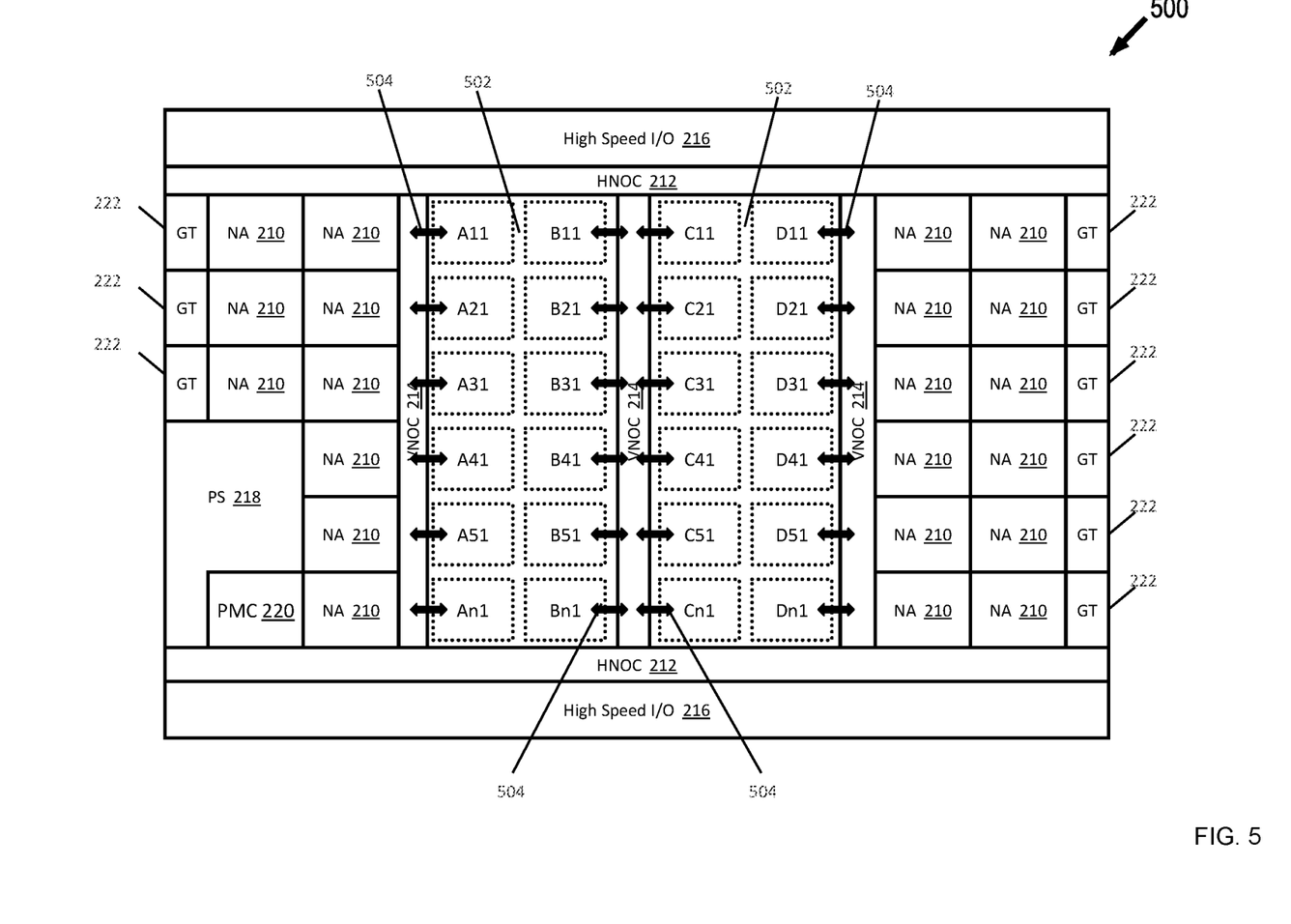
FIG. 5 is a block diagram that conceptually illustrates a communication scheme between the N-identical programmable logic partitions and spare logic partitions, according to some embodiments of the present disclosure.

By way of example, FIG. 5 shows an exemplary FPGA architecture 500 that conceptually illustrates the communication scheme (e.g., between the identical logic partitions) described above. In some embodiments, the FPGA architecture 500 is substantially the same as the FPGA architecture 400, discussed above with respect to FIG. 4. For example, the architecture 500 includes the unrestricted logic partitions NA 210, high speed I/O blocks 216, the PS 218, the PMC 220, and the GTs 222. Moreover, the architecture 500 includes the HNOC 212 and the VNOC 214, a fabric region A having identical logic partitions A11, A21, A31, A41, A51, and An1, a fabric region B having identical logic partitions B11, B21, B31, B41, B51, and Bn1, a fabric region C having identical logic partitions C11, C21, C31, C41, C51, and Cn1, and a fabric region D having identical logic partitions D11, D21, D31, D41, D51, and Dn1. For purposes of this discussion, the identical logic partitions of FIG. 5 may be substantially the same as the identical logic partitions described above with respect to FIG. 4. Thus, in some embodiments, the logic partition An1 is a spare logic partition for the fabric region A, the logic partition Bn1 is a spare logic partition for the fabric region B, the logic partition Cn1 is a spare logic partition for the fabric region C, and the logic partition Dn1 is a spare logic partition for the fabric region D.

As noted above, FIG. 5 also conceptually illustrates communication between the identical logic partitions of the fabric regions A, B, C, D. For example, FIG. 5 includes boundaries 502 between each logic partition for each of the fabric regions A, B, C, D. In general, the boundaries 502 conceptually illustrate that communication may not occur across the boundaries 502. Instead, each of the identical logic partitions of the fabric regions A, B, C, D may communicate with each other exclusively through the HNOC 212 and the VNOC 214, as indicated by double-sided arrows 504 that connect each of the identical logic portions to the VNOC 214. Further, since the VNOC 214 connects to the HNOC 212, each of the identical logic partitions of the fabric regions A, B, C, D may communicate with each other, while remaining somewhat isolated from one another. In some embodiments, the communication scheme described above with reference to FIG. 5 may be implemented within a place and route algorithm, for example, in order to allow for communication exclusively within a given logic partition or for communication from a given logic partition to the VNOC 214. In some embodiments, connections to other resources of the FPGA, such as to the unrestricted logic partitions NA 210, to the GTs 222, and to the high speed I/Os 216, are not restricted in the manner that communication between the identical logic partitions is restricted. However, in the present example, these other resources of the FPGA may not be defect tolerant. In some embodiments, it may be possible to extend the concepts used for the identical logic partitions (e.g., spare logic partitions and restricted communication paths) to other resources of the FPGA to make the other FPGA resources defect tolerant as well. By way of example, it may be possible to implement defect tolerant unrestricted logic partitions NA 210, or other defect tolerant regions of the FPGA. Moreover, embodiments of the present disclosure may further be implemented in different types of devices such as a graphics processing unit (GPU), which uses large groups of processing elements (which may be different from the processing elements used in an FPGA) arranged in a regular array, or in other types of suitable devices.

Figure 6:
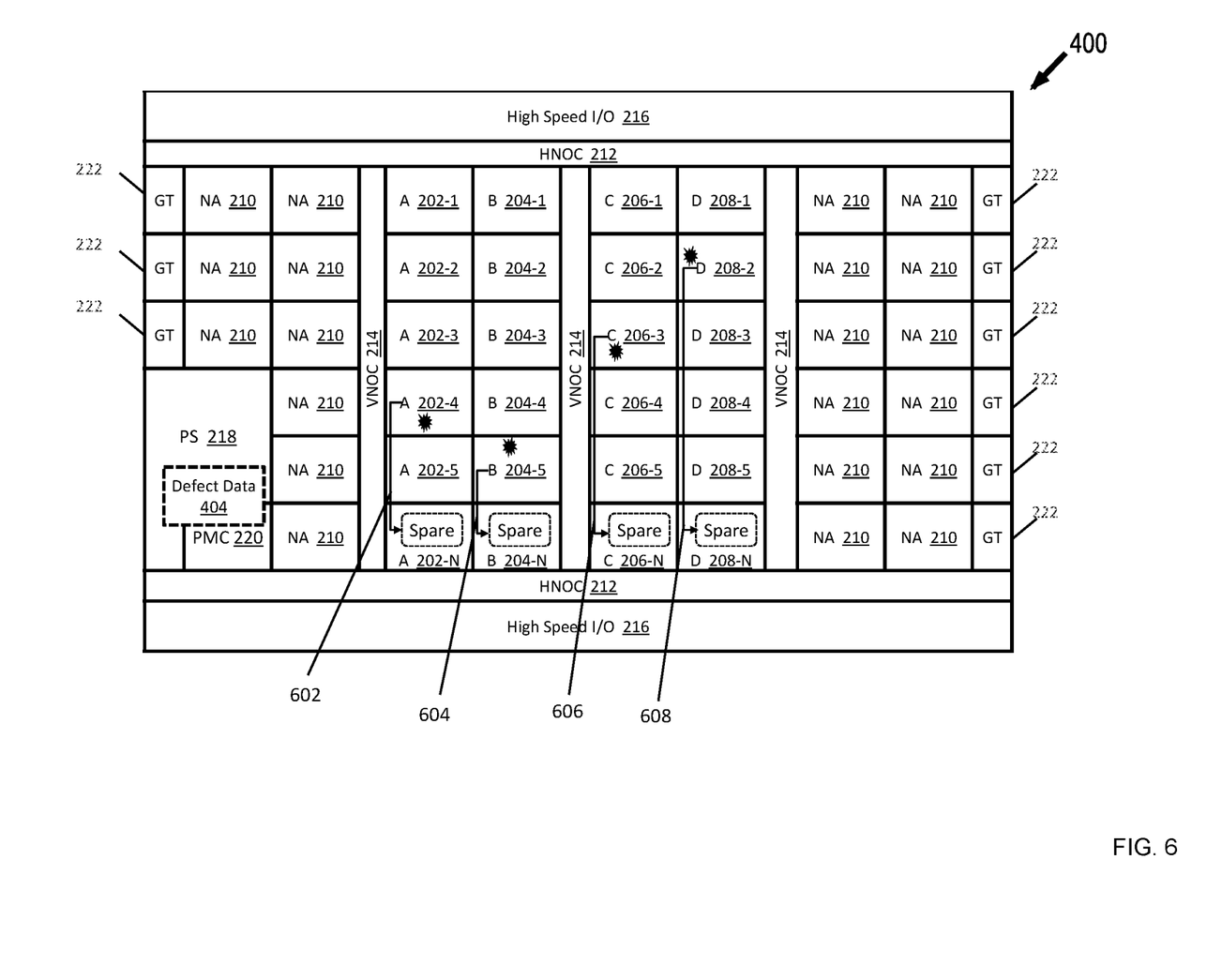
FIG. 6 is a block diagram illustrating an exemplary architecture for an IC, including N-identical programmable logic partitions and spare logic partitions, and showing the remapping of defective logic partitions to spare logic partitions, according to some embodiments.

Referring to FIG. 6, illustrated therein is the FPGA architecture 400 (FIG. 4) and including the defects 402 and the defect data 404. The example of FIG. 6 provides additional detail with respect to the process that occurs at the PMC 220. As described above, and in some embodiments, the platform management controller (PMC) 220 accesses the defect data 404 at a configuration load time or during a partial reconfiguration process and thus knows the location of the defective logic partitions (e.g., the defective logic partitions A 202-4, B 204-5, C 206-3, and D 208-2). During the configuration load time or during the partial reconfiguration process, the PMC 220 may determine that a defective logic partition is about to be configured, and thus the defective logic partition needs to be remapped to a spare logic partition. In the present example, the defective logic partition A 202-4 is remapped to the spare logic partition A 202-N (as indicated by arrow 602), the defective logic partition B 204-5 is remapped to the spare logic partition B 204-N (as indicated by arrow 604), the defective logic partition C 206-3 is remapped to the spare logic partition C 206-N (as indicated by arrow 606), and the defective logic partition D 208-2 is remapped to the spare logic partition D 208-N (as indicated by arrow 608). Stated another way, the configuration that was going to be implemented or instantiated within a given defective logic partition (e.g., by a configuration bitstream), is instead implemented or instantiated within an identical spare logic partition. In addition, and as part of the remapping process, the NOC routing tables may be updated to reflect the swapping of the defective logic partitions A 202-4, B 204-5, C 206-3, and D 208-2 with the identical spare logic partitions A 202-N, B 204-N, C 206-N, and D 208-N.

Figure 7:
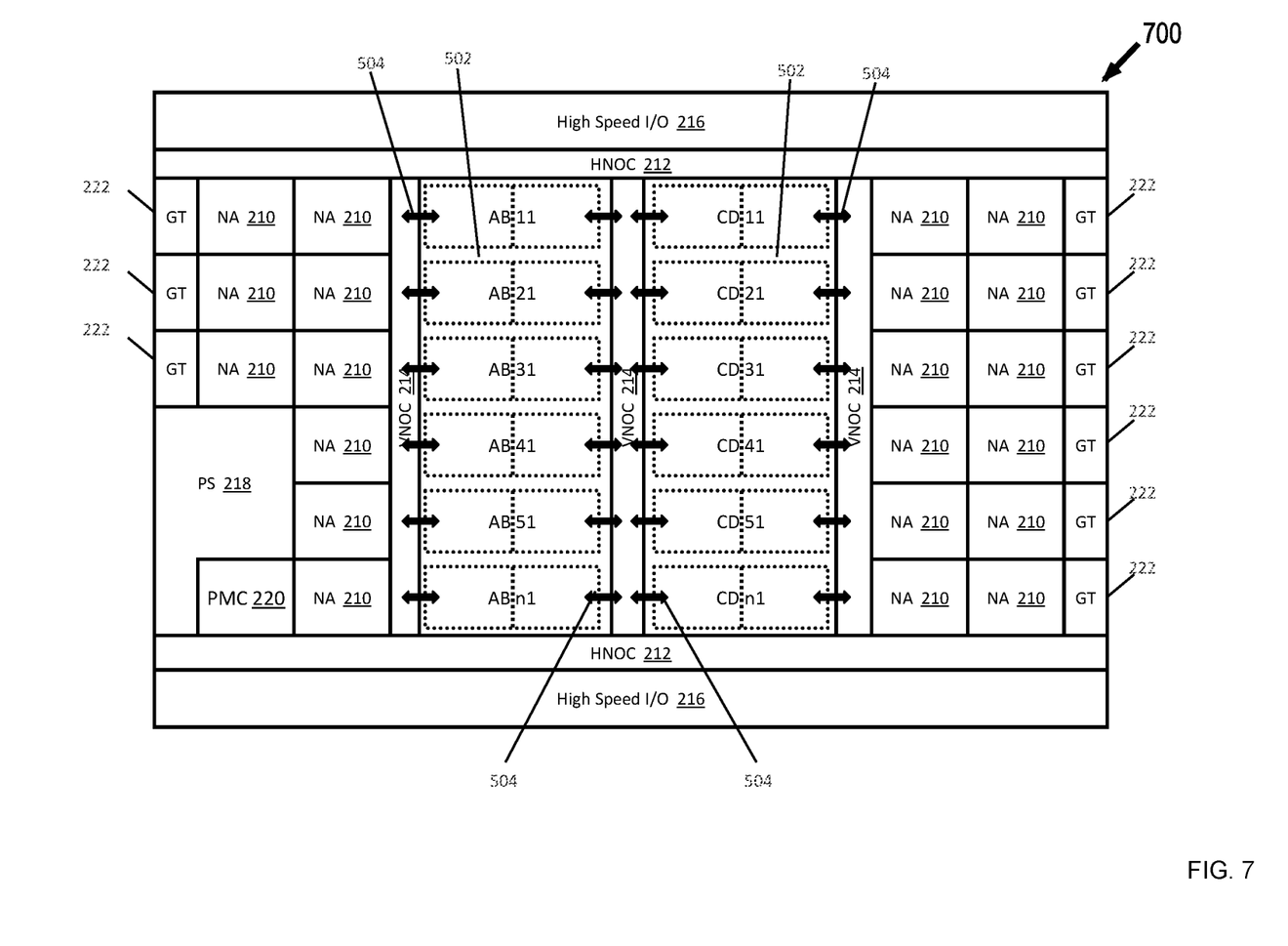
FIG. 7 is a block diagram illustrating an exemplary architecture for an IC, including N-identical double logic partitions and spare double logic partitions, according to some embodiments of the present disclosure.

With reference to FIG. 7, illustrated therein is an FPGA architecture 700 similar in some respects to the architecture 500 of FIG. 5. The architecture 500, as well as most the other architectures shown and described herein, includes identical logic partitions each composed of a single logic partition. For example, still referring to FIG. 5, fabric region A includes single logic partitions A11, A21, A31, A41, A51, and An1; fabric region B includes single logic partitions B11, B21, B31, B41, B51, and Bn1; fabric region C includes single logic partitions C11, C21, C31, C41, C51, and Cn1; and fabric region D includes single logic partitions D11, D21, D31, D41, D51, and Dn1. The architecture 700, in contrast, includes identical logic partitions each composed of a double logic partition. In some embodiments, a double logic partitions refers to two single logic partitions merged to form a larger, double logic partition. For example, with reference to FIG. 7, fabric regions A and B have been merged to include double logic partitions AB11, AB21, AB31, AB41, AB51, and ABn1. Similarly, the fabric regions C and D have been merged to include double logic partitions CD11, CD21, CD31, CD41, CD51, and CDn1. By way of example, if a defect is detected in one or both partitions of a double logic partition, then the defective double logic partition can be swapped with an identical spare double logic partition. For example, if a defect is found within the double logic partition AB21, the defective double logic partition AB21 may be swapped with the identical spare double logic partition ABn1. While examples of both single logic partitions and double logic partitions have been provided, these examples are not meant to be limiting in any way. For instance, in some embodiments, an FPGA architecture may instead include a quad logic partition (e.g., including four single logic partitions). As merely one example, and with reference to FIG. 7, a quad logic partition may be implemented by merging the double logic partition AB11 and the neighboring double logic partition AB21. For the case of the quad logic partition, an identical spare quad logic partition may also be provided. In other embodiments, still other sizes of logic partitions and spare logic partitions may be implemented without departing from the scope of the present disclosure.

Figure 8A:
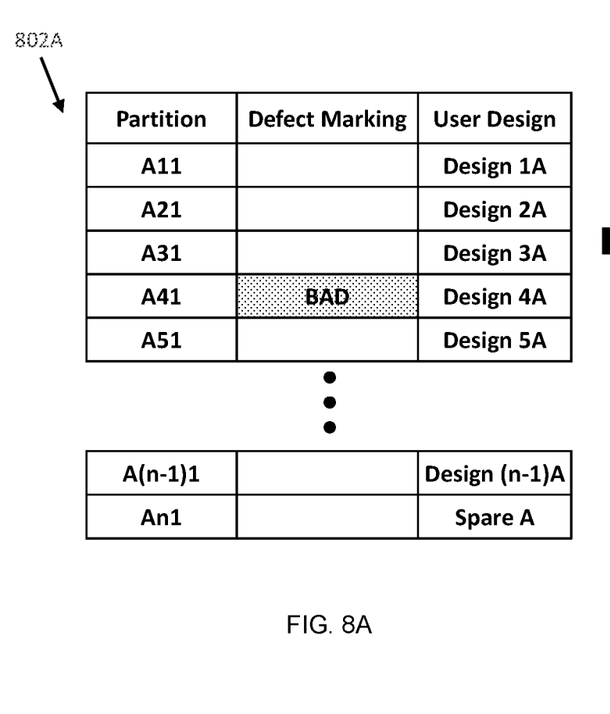
FIGS. 8A and 8B illustrate exemplary tables showing how a user design is implemented using the spare logic partitions when a defect is found within a particular programmable fabric region, in accordance with some embodiments.
Figure 8B:
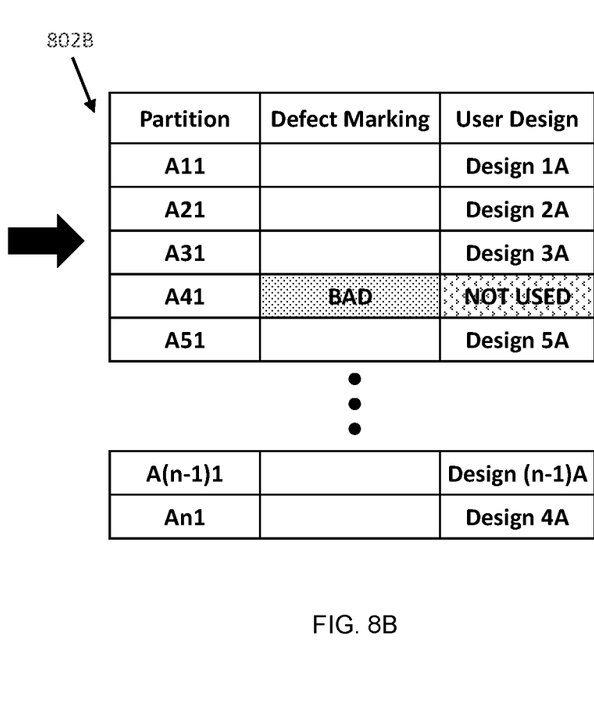

Referring to FIGS. 8A and 8B, illustrated therein are exemplary tables showing how a user design (e.g., user configuration) is implemented using the spare logic partitions, for example, when a defect is found within a particular programmable fabric region, in accordance with some embodiments. By way of example, FIG. 8A shows a table 802A associated with a programmable fabric region A, similar to the fabric region A described above. As shown in the 'Partition' column of the table 802A, the fabric region A includes n-identical logic partitions A11, A21, A31, A41, A51, A(n−1)1, and An1, where Aw1 is a spare logic partition for the fabric region A. In some embodiments, the 'User Design' column of the table 802A shows an original user design, for example, as received by a configuration bitstream at the PMC 220. As shown, the original user design includes a design 1A in partition A11, design 2A in partition A21, design 3A in partition A31, design 4A in partition A41, design 5A in partition A51, and design (n−1)A in partition A(n−1)1. There is no user design in partition An1, which is the spare logic partition, and because the number of available user-programmable logic partitions is reduced to provide the spare An1. Thus, the spare An1 is not accessible to a user as a logic partition resource. FIG. 8A also includes a 'Defect Marking' column that provides an indication as to whether any of the logic partitions within the fabric region A have been marked as unusable, for example, by using a fuse (e.g., an eFuse), an antifuse, or by another one-time programmable on-die medium. In the present example, the logic partition A41 has been marked as 'BAD' and is thus unusable. FIG. 8B shows a table 802B that illustrates the configuration transformation of the table 802A to the table 802B, for example, as performed by the PMC 220. As shown in FIG. 8B, the 'Partition' column and the 'Defect Marking' column are the same as the table 802A, but the 'User Design' column is different. In particular, the 'User Design' column of the table 802B illustrates that the PMC 220 (e.g., at a configuration load time or during a partial reconfiguration process), knowing that the logic partition A41 has been marked as 'BAD', will change a status of the logic partition A41 to 'NOT USED' and will remap the design 4A (originally intended to go into the defective logic partition A41) to the identical spare logic partition An1. In various examples, one or both of the tables 802A and 802B may be stored in one or more memory elements within the IC and accessible to the PMC 220.

Figure 9:
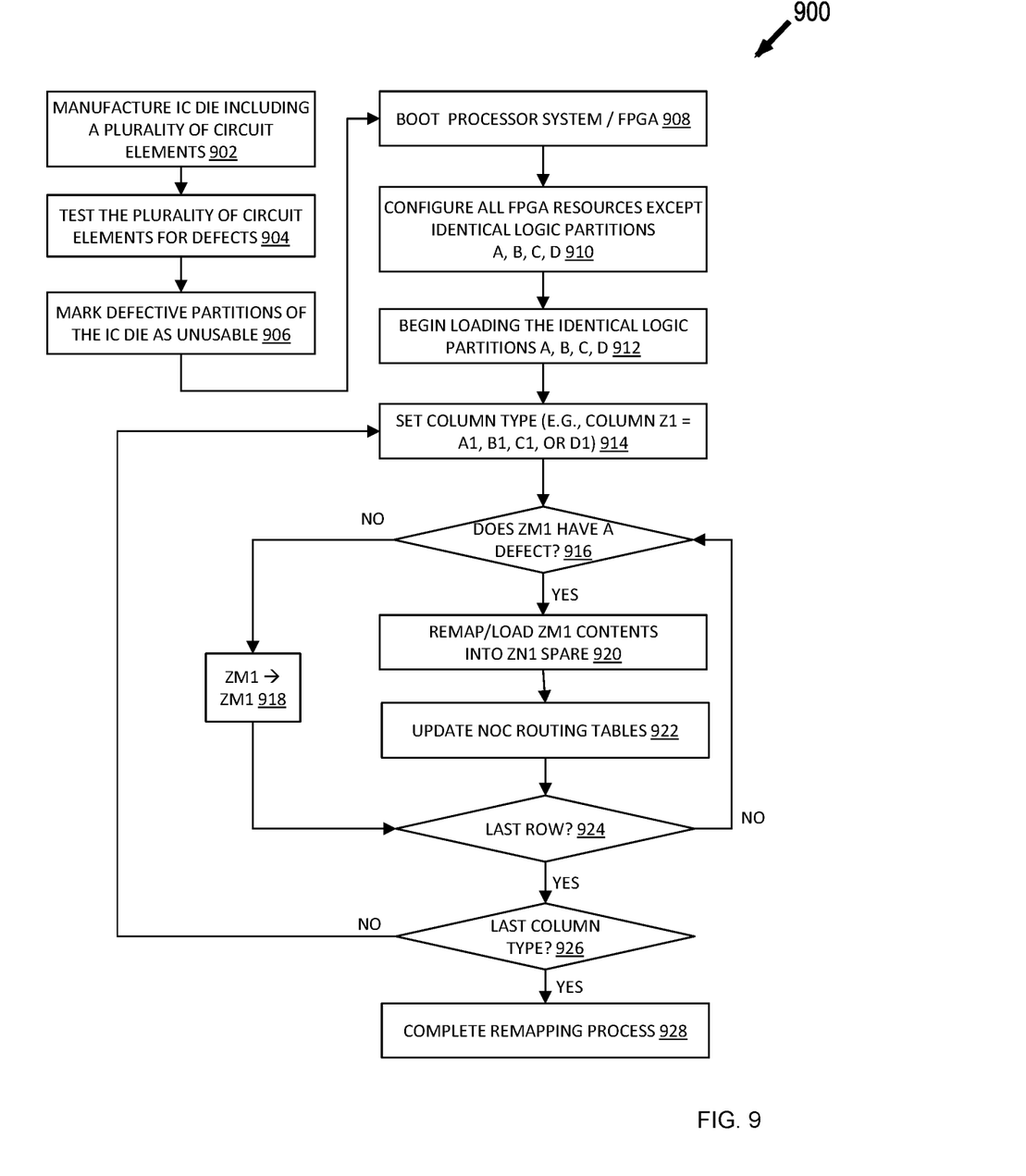
FIG. 9 is a flow diagram illustrating a method for swapping a defective logic partition with an identical spare logic partition, according to some embodiments of the present disclosure.

With reference now to FIG. 9, a method 900 for swapping a defective logic partition with an identical spare logic partition is illustrated. In some embodiments, at least some portions of the method 900 (e.g., blocks 910-928) are performed by the PMC 220, for example, at a configuration load time or during a partial reconfiguration process. Initially, at block 902, a plurality of IC die having a plurality of circuit elements formed thereon is manufactured on a semiconductor wafer. In some embodiments, the manufactured IC die may include programmable logic devices, such as FPGA devices. In various examples, the manufactured FPGA devices may include one or more of the features described above, such as N-identical programmable logic partitions having identical layout and resources, a network-on-a-chip, as well as other resources. After manufacture of the IC die, the method 900 proceeds to block 904, where an electronic tester may be used to test the functionality of the circuit elements on each of a plurality of IC die manufactured on a semiconductor wafer. Thereafter, at block 906, logic partitions within the IC die that are found to have defective circuit elements will have that logic partition marked as being defective and/or unusable. In some embodiments, the defective logic partition may be marked by using a fuse (e.g., an eFuse), an antifuse, or by another one-time programmable on-die medium. In addition to physically marking the defects, defect data may be generated and saved, for example for subsequent access by the PMC 220, where the defect data corresponds to the marked defects and identifies the location of each of the defects. In some embodiments, the defect data 404 is stored in an on-chip memory and is accessible to the PMC 220 at a configuration load time or during a partial reconfiguration process.

After manufacture, testing, and marking of the IC die, the method 900 proceeds to block 908, where an FPGA/FPGA processor system is booted. Thereafter, at block 910 of the method 900, substantially all of the FPGA resources (e.g., I/O blocks, GTs, HNOC, VNOC, etc.) are configured, except for the identical logic partitions of the fabric regions A, B, C, D, discussed above. The method 900 proceeds to block 912, where the loading/configuration of the identical logic partitions of the fabric regions A, B, C, D begins. For example, initially and as shown at block 914, a column type is set. By way of illustration, and in some embodiments, the logic partitions of the fabric regions A, B, C, D may be broken up or referred to as separate columns such as columns A, B, C, D. In some embodiments, a row counter is initially set (e.g., set row=1). Thereafter, the method 900 begins to walk through each row of the logic partitions of the fabric regions A, B, C, D. In particular, at block 916, it is determined (e.g., by the PMC reading the defect data) whether a first logic partition ZM1 has a defect. By way of example, if the column type was set to A (Z1=A1) at block 914, then at block 916 the method may begin by checking for defects within the first row of column A (logic partition ZM1), which in this case may be logic partition A11 (e.g., as shown in FIG. 5). In some embodiments, if the defect data indicates that there is no defect within ZM1 (e.g., A11), then the method 900 proceeds to block 918 where the logic partition ZM1 is configured with the design originally intended to be loaded into the logic partition ZM1. In contrast, at block 916, if the defect data indicates that there is a defect within ZM1 (e.g., A11), then the method 900 proceeds to block 920 where the design originally intended to be loaded into the logic partition ZM1 is remapped to an identical spare logic partition ZN1, which is the present example may be AN1. Thereafter, at block 922 and as part of the remapping process, the NOC routing tables may be updated to reflect the swapping of the defective logic partition ZM1 (e.g., A11) with the identical spare logic partition ZN1 (e.g., AN1). The method 900 then proceeds to block 924 where it is determined if the last row of the selected column (e.g., column A) has been reached. If not, then the method 900 returns to block 916 and advances to the next row in the selected column (incrementing the row counter by 1), where the next row (e.g., A21) is checked for defects. The same process is followed as discussed above for logic partition Z1M, and depending on whether or not the next row is determined to have defects. Once the last row of the selected column has been reached (block 924), the method 900 proceeds to block 926 where it is determined if the last column type (e.g., A, B, C, or D) has been reached. If not, then the method 900 returns to block 914 and advances to the next column type (e.g., column B), where the first row of the next column (e.g., column B) is checked for defects (block 916), and the same process is followed as discussed above for the first column (e.g., column A). Once the last column type has been reached (block 926), the method 900 proceeds to block 928 where the remapping process is completed (e.g., by the PMC 220). It is noted that in the various embodiments disclosed herein, including the method 900, the configuration/remapping process performed by the PMC 220, when one or more defects are present, may be automatically managed and completely user-transparent. In addition, embodiments of the present disclosure, such as the method 900, may be implemented as a software "mode", such that if a user would like to utilize conventional place and route tools and design styles, then such preferences can be accommodated (e.g., at least for cases where there are no defects in a given IC die).

It is noted that various configurations (e.g., the number of identical logic partitions within each fabric region A, B, C, D, the number of fabric regions, the number of total spare logic partitions, and the number of spare logic partitions for each fabric region are exemplary only and are not intended to be limiting beyond what is specifically recited in the claims that follow. It will be understood by those skilled in that art in possession of this disclosure that other configurations may be used.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. For example, in some embodiments, a defective logic partition may not be marked by using a fuse (e.g., an eFuse), an antifuse, or by another one-time programmable on-die medium. Instead, each of the identical logic partitions within each of the fabric regions A, B, C, D (including any spare logic partitions within a given fabric region) may be programmed (e.g., during a manufacturing process) with a logical address associated with a given logic partition, for example, by using one or more fuses (e.g., one or more eFuses), one or more antifuses, or by one or more other one-time programmable on-die medium. In some cases, because each of the identical logic partitions are addressable, with their respective logical addresses burned or marked in hardware (e.g., by one or more eFuses, etc.), the remapping of defective logic partitions to spare logic partitions may be automatically managed at the hardware level. In some embodiments, an on-die processor (e.g., such as the PMC 220) may be used to perform a self-test of the identical logic partitions and thus determine the logical address of defective partitions. As a result of knowing the logical address for the defective partitions and in some examples, the on-die processor may directly program or re-program on-die remapping hardware, or the on-die processor may remap data (e.g., a design) that was originally intended to go to a defective logic partition to an identical spare logic partition, as discussed above. The specification and drawings are, accordingly, to be regarded in an illustrative rather than restrictive sense. The claimed inventions are intended to cover alternatives, modifications, and equivalents.

What is claimed is:

1. A method, comprising:
   providing an integrated circuit (IC) die having a plurality of logic partitions, each logic partition having a same first layout design, and wherein the plurality of logic partitions includes a defective logic partition and a spare logic partition;
   loading configuration data into the IC die, wherein the configuration data is configured to instantiate a circuit design within the defective logic partition; and
   prior to instantiating the circuit design within the defective logic partition, remapping the circuit design from the defective logic partition to the spare logic partition.

2. The method of claim 1, wherein the defective logic partition is marked using a one-time programmable on-die medium including one of a fuse and an antifuse.

3. The method of claim 1, further comprising:
   loading the configuration data into an on-die configuration processor of the IC die, wherein the on-die configuration processor accesses defect data associated with the defective logic partition and performs the remapping based on the defect data.

4. The method of claim 1, further comprising:
   responsive to the loading the configuration data, configuring a network-on-a-chip (NOC), wherein the NOC includes routing tables that identify source and destination addresses, and wherein based on the remapping the circuit design, updating the routing tables.

5. The method of claim 4, wherein the defective logic partition and the spare logic partition communicate with each other exclusively through the NOC.

6. The method of claim 1, wherein prior to loading the configuration data into the IC die the plurality of logic partitions are non-functional.

7. A method, comprising:
   testing the functionality of an integrated circuit (IC) die that includes a plurality of programmable fabric regions, wherein each of the plurality of programmable fabric regions includes a plurality of identical logic partitions, wherein at least one logic partition within each of the plurality of programmable fabric regions is a spare logic partition, and wherein each of the plurality of identical logic partitions within each of the plurality of programmable fabric regions are configured to communicate with each other exclusively through a network-on-a-chip (NOC); and
   marking at least one of the plurality of identical logic partitions within a given programmable fabric region as unusable;
   wherein the unusable logic partition is configured for swapping with the spare logic partition within the given programmable fabric region instead of instantiating a circuit design within the unusable logic partition.

8. The method of claim 7, wherein the IC die includes a programmable logic device, wherein the IC die includes a processor integrated within the IC die, and wherein the processor is configured to perform the swapping of the unusable logic partition with the spare logic partition.

9. The method of claim 7, wherein the NOC includes a vertical NOC (VNOC) and a horizontal NOC (HNOC), and wherein each of the plurality of identical logic partitions within each of the plurality of programmable fabric regions is directly connected to the VNOC.

10. The method of claim 7, further comprising:
in response to marking the at least one of the plurality of identical logic partitions as unusable, generating and storing, within a memory integrated on the IC die, defect data associated with the unusable logic partition.

11. The method of claim 7, further comprising:
after marking the at least one of the plurality of identical logic partitions within the given programmable fabric region as unusable, and prior to configuring the plurality of programmable fabric regions, configuring both the NOC and programmable logic blocks outside the plurality of programmable fabric regions.

12. The method of claim 7, further comprising:
after marking the at least one of the plurality of identical logic partitions within the given programmable fabric region as unusable, instantiating, by a processor integrated within the IC die, a first circuit design within a defect-free logic partition of the given programmable fabric region; and
after instantiating the first circuit design within the defect-free logic partition, and instead of instantiating a second circuit design within the unusable logic partition, instantiating, by the processor, the second circuit design within the spare logic partition of the given programmable fabric region.

13. An integrated circuit (IC) die comprising:
a region including N identical programmable tiles, wherein N−1 of the identical programmable tiles are user-programmable, and wherein at least one of the N identical programmable tiles is a spare programmable tile;
a network-on-a-chip (NOC), wherein the N identical programmable tiles are configured to communicate with each other exclusively through the NOC; and
a processor integrated on the IC die, wherein the processor is configured to swap a defective one of the N−1 identical programmable tiles with the spare programmable tile instead of instantiating a circuit design within the defective one of the N−1 identical programmable tiles.

14. The IC die of claim 13, wherein the IC die includes a programmable logic device.

15. The IC die of claim 13, wherein the region includes a programmable fabric region, wherein the identical programmable tiles include functionally equivalent programmable logic partitions, and wherein the spare programmable tile includes a spare logic partition.

16. The IC die of claim 13, wherein the NOC further includes a vertical NOC (VNOC) and a horizontal NOC (HNOC), and wherein each of the identical programmable tiles is directly connected to the VNOC.

17. The IC die of claim 13, further comprising:
a memory integrated on the IC die, the memory storing defect data, wherein the memory is connected to the processor, and wherein the processor is configured to access the defect data prior to performing the swapping.

18. The IC die of claim 13, further comprising:
a one-time programmable on-die medium including one of a fuse and an antifuse, wherein the one-time programmable on-die medium is configured to mark the defective one of the N−1 identical programmable tiles.

19. The IC die of claim 18, wherein the N−1 identical programmable tiles include N−1 functionally equivalent programmable logic partitions, and wherein the one-time programmable on-die medium is configured to mark the defective one of the N−1 functionally equivalent programmable logic partitions.

20. The IC die of claim 13, wherein a first pair of identical programmable tiles are merged to form a double logic partition, at least one programmable tile of the first pair including a defect, wherein a second pair of identical programmable tiles are merged to form a spare double logic partition, and wherein the double logic partition is configured for swapping with the spare double logic partition.

* * * * *